United States Patent
Cao et al.

(10) Patent No.: US 10,289,649 B2
(45) Date of Patent: May 14, 2019

(54) WEBPAGE ADVERTISEMENT INTERCEPTION METHOD, DEVICE AND BROWSER

(71) Applicant: BEIJING QIHOO TECHNOLOGY COMPANY LIMITED, Beijing (CN)

(72) Inventors: Long Cao, Beijing (CN); Huan Ren, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 157 days.

(21) Appl. No.: 15/033,081

(22) PCT Filed: Sep. 12, 2014

(86) PCT No.: PCT/CN2014/086434
§ 371 (c)(1),
(2) Date: Apr. 28, 2016

(87) PCT Pub. No.: WO2015/062366
PCT Pub. Date: May 7, 2015

(65) Prior Publication Data
US 2016/0283499 A1    Sep. 29, 2016

(30) Foreign Application Priority Data
Nov. 1, 2013  (CN) .......................... 2013 1 0535916

(51) Int. Cl.
*G06F 16/958* (2019.01)
*G06F 16/957* (2019.01)
(Continued)

(52) U.S. Cl.
CPC .......... *G06F 16/958* (2019.01); *G06F 3/0482* (2013.01); *G06F 3/04817* (2013.01);
(Continued)

(58) Field of Classification Search
CPC ...................................................... G06F 17/30
See application file for complete search history.

(56) References Cited

U.S. PATENT DOCUMENTS

| 6,675,230 B1 * | 1/2004 | Lewallen | G06F 9/4492 719/328 |
| 2004/0122888 A1 * | 6/2004 | Carmichael | H04L 12/2801 709/200 |
| 2014/0149995 A1 * | 5/2014 | Tian | G06F 17/30899 719/313 |

FOREIGN PATENT DOCUMENTS

| CN | 101655863 A | 2/2010 |
| CN | 102624891 A | 8/2012 |

(Continued)

*Primary Examiner* — James J Debrow
(74) *Attorney, Agent, or Firm* — Baker & Hostetler LLP

(57) ABSTRACT

The disclosure discloses a webpage advertisement interception method, device and browser. The method includes: using a first browser kernel to receive a first load request of a current webpage at a browser side; activating a second browser kernel when determining the current webpage is suitable for loading by the second browser kernel; using the first browser kernel to generate a second load request of the current webpage when it is monitored the second browser kernel requests to load the current webpage; using a preset first determination rule to search a webpage element which needs intercepting in the current webpage; using the second browser kernel to intercept the webpage element when the webpage element is found. The disclosure avoids poor utility of a multi-kernel browser caused by disorder of advertisement interception and non-versatility of interception rules when switching kernels, increases the efficiency and success rate of advertisement interception.

13 Claims, 3 Drawing Sheets

--- using a first browser kernel to receive a first load request of a current webpage at a browser side — 101 activating a second browser kernel when determining the current webpage is suitable for loading by the second browser kernel — 102 using the first browser kernel to generate a second load request of the current webpage when it is monitored the second browser kernel requests to load the current webpage — 103 using a preset first determination rule to search the webpage element which needs intercepting in the current webpage — 104 when found, using the second browser kernel to intercept the webpage element — 105

(51) Int. Cl.
*G06Q 30/02* (2012.01)
*G06F 3/0481* (2013.01)
*G06F 3/0482* (2013.01)
*G06F 3/0484* (2013.01)
*G06F 17/22* (2006.01)

(52) U.S. Cl.
CPC ...... *G06F 3/04842* (2013.01); *G06F 16/9577* (2019.01); *G06F 17/227* (2013.01); *G06F 17/2247* (2013.01); *G06Q 30/0277* (2013.01)

(56) References Cited

FOREIGN PATENT DOCUMENTS

| | | |
|---|---|---|
| CN | 102932356 A | 2/2013 |
| CN | 102999636 A | 3/2013 |
| CN | 103052950 A | 4/2013 |
| CN | 103605688 A | 2/2014 |

\* cited by examiner

| using a first browser kernel to receive a first load request of a current webpage at a browser side | 101 |
| activating a second browser kernel when determining the current webpage is suitable for loading by the second browser kernel | 102 |
| using the first browser kernel to generate a second load request of the current webpage when it is monitored the second browser kernel requests to load the current webpage | 103 |
| using a preset first determination rule to search the webpage element which needs intercepting in the current webpage | 104 |
| when found, using the second browser kernel to intercept the webpage element | 105 |

FIG. 1

| using a first browser kernel to receive a first load request of a current webpage at a browser side | 201 |
| when it is determined the current webpage is suitable for loading by the first browser kernel, using a preset second determination rule to search the webpage element which needs intercepting in the current webpage | 202 |
| when found, using the first browser kernel to intercept the webpage element | 203 |

FIG. 2

WEBPAGE ADVERTISEMENT INTERCEPTION METHOD, DEVICE AND BROWSER

CROSS-REFERENCE TO RELATED APPLICATIONS

This application is a national stage of PCT/CN2014/086434 filed Sep. 12, 2014, which is based upon and claims priority to Chinese Patent Application No. CN201310535916.2 filed Nov. 1, 2013, the entire contents of all of which are incorporated herein by reference.

FIELD OF TECHNOLOGY

The disclosure relates to the field of browser and, more particularly, to a webpage advertisement interception method, a webpage advertisement interception device and a browser.

BACKGROUND

A browser may be divided into two parts in architecture, which are kernel and shell. The browser kernel refers to the core part of the browser, which may be divided into to two part: a layout engineer (or Rendering engine) and a JavaScript (JS) engine. The layout engineer mainly takes charge of obtaining content of webpage (including HTML, XML, images and so on), collating information (such as adding cascading style sheets (CSS) and so on), and calculating the display way of webpage, and then outputting the webpage to display or printer. Different browser kernel may lead to different grammar explanation of webpage, thusly the rendering effect may also be different. All the webpage browser, Email client side and other application which need to edit and display network content need kernel. JS engine is used to parse JavaScript language, execute JavaScript language to obtain dynamic effect of the webpage.

There are various kinds of browser kernel. The commonly-seen browser kernel is Trident kernel used by IE browser from Microsoft, Gecko kernel used by Firefox browser, Webkit kernel used by Safari browser from Apple and chrome browser from Google, and Presto kernel used by Opera browser.

The webpage is usually made according to a certain network standard supported by certain kernel. A network standard supported by certain kernel may not be supported well by other kernels (even cannot be supported by other kernels). For example, when the user uses Firefox browser to browse webpage, the browse kernel of the Firefox may support W3C standard well, thus the browser may be used to browse W3C standard webpages, however, if the user would like to browse bank webpages and use the web bank, the Firefox browser may not satisfy the user's requirement. That is because many web banks and on line payment system requires Active X plug-in function, the function may be supported only by Trident kernel of IE browser, thusly the user cannot use network bank when using the Firefox browser.

To make the user have better experience, the browser manufacturer invented a dual kernel browser mode, that is one browser has two kernels.

When the browser is used to browse the webpage, there is a situation that many webpages may firstly pop out two or three advertisement windows, such as skyscraper advertisements which occupies the whole browser window page display area, and then display the webpage body. However, the webpage body also has many banner advertisements, hover advertisements and floating advertisements, and there are also popped-out Active X control and plug-in installation and downloading, run prompt dialogue, Java program requiring to install Java virtual machine and so on, which seriously affects user browsing webpage, and also increases system running burden.

SUMMARY

In the view of above problems, the disclosure is proposed to provide a webpage advertisement interception method, a webpage advertisement interception device and a browser, which solves the problem above or at least partly solves the problem above.

According to an aspect of the disclosure, there is provided a webpage advertisement interception method including:

using a first browser kernel to receive a first load request of a current webpage at a browser side;

activating a second browser kernel when determining the current webpage is suitable for loading by the second browser kernel;

using the first browser kernel to generate a second load request of the current webpage when it is monitored the second browser kernel requests to load the current webpage;

using a preset first determination rule to search a webpage element which needs intercepting in the current webpage;

using the second browser kernel to intercept the webpage element when the webpage element is found.

According to an aspect of the disclosure, there is provided a webpage advertisement interception device including:

a first load request receiving module, configured to use a first browser kernel to receive a first load request of a current webpage at a browser side;

a second browser kernel activating module, configured to activate a second browser kernel when determining the current webpage is suitable for loading by the second browser kernel;

a second load request generating module, configured to use the first browser kernel to generate a second load request of the current webpage when it is monitored the second browser kernel requests to load the current webpage;

a first webpage element searching module, configured to use a preset first determination rule to search a webpage element which needs intercepting in the current webpage;

a first webpage element intercepting module, configured to use the second browser kernel to intercept the webpage element when the webpage element is found.

According to an aspect of the disclosure, there is provided a browser including:

a first load request receiving module, configured to use a first browser kernel to receive a first load request of a current webpage at a browser side;

a second browser kernel activating module, configured to activate a second browser kernel when determining the current webpage is suitable for loading by the second browser kernel;

a second load request generating module, configured to use the first browser kernel to generate a second load request of the current webpage when it is monitored the second browser kernel requests to load the current webpage;

a first webpage element searching module, configured to use a preset first determination rule to search a webpage element which needs intercepting in the current webpage;

a first webpage element intercepting module, configured to use the second browser kernel to intercept the webpage element when the webpage element is found.

According to still another aspect of the disclosure, there is provided computer program including computer readable code, when the computer readable code is executed on an electronic apparatus, causing the electronic apparatus to perform the intercepting method of the webpage advertisement.

According to still another aspect of the disclosure, there is provided a computer readable medium, having stored the computer program.

The beneficial effect of the disclosure lies in:

In the disclosure, by integrating at least two browser kernels in one browser, based on the advantage or disadvantage of each browser, when it is determined that the current webpage is suitable for loading by the second browser kernel, activating the second browser kernel to load the current webpage, thusly the efficient of loading the webpage maybe increased. When using the second browser kernel to load the current webpage, it is capable to use advertisement interception rule suitable for the second browser kernel to intercept the advertisement, which avoids poor practicability caused by the disorder in intercepting advertisements when the multi-kernel browser switches the kernels and the non-universality of intercepting rule, improves the efficiency in intercepting the advertisement and successful rate, obtaining a good practicability, the system resource occupation is reduced after the advertisement is intercepted, and the webpage loading efficiency is improved.

The first determination rule of the disclosure may be black list and/or white list, the regulation expression is matched based on the URL of the webpage, thereby achieving a simple operation, fast processing and less occupation of system resource.

In the disclosure, when it is determined that the current webpage is suitable to use the first browser kernel to load the current webpage and use the advertisement interception rule suitable for the first browser kernel to intercept the advertisement, achieving the dynamic switch of intercepting rule according to the switch of the browser kernel, realizing the seamless switching intercepting of the multi-kernel browser to the advertisement, improves the advertisement efficiency and success rate, improves the efficiency in intercepting the advertisement and successful rate, obtaining a good practicability, the system resource occupation is reduced after the advertisement is intercepted, and the webpage loading efficiency is improved.

The second determination rule of the disclosure may be user-defined intercept list, the intercept list provided by the browser provider or the intercept list of the third-party plug-ins, which has variety of determining modes, practicability, matching based on webpage URL, simple operation, being fast, high accuracy is intercepting advertisements, less occupation of system resource.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the disclosure. Further, throughout the drawings, same elements are indicated by same reference numbers. In the drawings:

FIG. 1 is a flow chart showing the steps of the webpage advertisement interception method according to the first embodiment of the disclosure;

FIG. 2 is a flow chart showing the steps of the webpage advertisement interception method according to the second embodiment of the disclosure;

DESCRIPTION OF THE EMBODIMENTS

Figure 3:
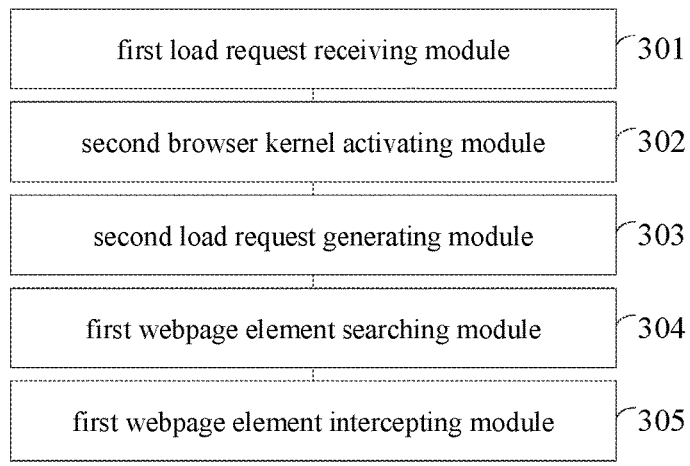
FIG. 3 is a block diagram showing a webpage advertisement interception device according to an embodiment of the disclosure.

Exemplary embodiments of the present disclosure will be described in detail with reference to the accompanying figures hereinafter.

FIG. 1 is a flow chart showing the steps of the webpage advertisement interception method according to the first embodiment of the disclosure; which may specifically include the following steps:

step 101, using a first browser kernel to receive a first load request of a current webpage at a browser side;

it should be noted that, in the embodiment of the disclosure, the browser in the embodiment of the disclosure may include two or more browser kernels, the first browser kernel may be the default browser kernel of the browser, the default browser kernel may be set by system or by the user, which may be specifically a high performance browser kernel such as the Webkit. It may also be a Gecko kernel, a Presto kernel and so on, the embodiment of the disclosure is not limited thereto.

The second browser kernel may be other browser kernels except the first browser kernel built in the browser, it may adapt to the loading of the current webpage under some circumstances, such as the Trident kernel (that is the IE kernel) including an IE-com kernel (which is compatible with IE kernel) and/or IE-standard kernel. Obviously, it may also be Gecko kernel, Presto kernel and so on, the embodiment of the disclosure is not limited thereto.

The first load request of the current webpage may be an instruction of loading certain webpage sent by a user. For example, the user may open certain webpage by clicking certain link or open certain webpage by inputting certain URL in the address bar and so on. When the instruction is the user clicking certain link, it equals to receiving the request to load certain webpage sent by the user; similarly, when the instruction is the user inputting certain URL in the address bar and click the yes button or the enter button, it also equals to receiving the request of loading the webpage from the user.

Wherein the content of loading request may include the identification of request loading the webpage from the user and/or webpage characteristic. The webpage identification may represent a uniquely determined webpage information, such as uniform resource identifier (URI), the URI may specifically include uniform resource locator (URL) or uniform resource name (URN) and so on.

In order to make a skilled person in the art better understand the embodiment of the disclosure, in the specification, the URL is taken as an example of the webpage identification to illustrate.

Step 102, activating a second browser kernel when determining the current webpage is suitable for loading by the second browser kernel;

in specific application, the method for obtaining the matching relation between the user requested webpage and the browser kernel (that is which browser kernel is suitable to load the current webpage) may include various kinds of methods.

In the first method, it is capable to obtain the adaption relation between the user requested webpage and the browser kernel according to the content obtained from the request information and the preset rule.

Detailedly, the preset rule may include specific adaption rules, general adaption rules and/or non-adaption rules. During the process of requesting to load the webpage, the adaption relation between the user-requested webpage and the browser kernel may be obtained according to the specific adaption rules, general adaption rules and/or non-adaption rules. Wherein the specific adaption rules may include the adaption relation between webpages and kernels, the general adaption rules may include selecting the browser kernel whose average loading speed is the fastest for the user, or selecting the browser kernel which supports the web standard best. The non-adaption rule may include the non-adaption relation between the webpages and the kernels.

Since the browser may also send the loading request information about loading webpage to the corresponding server according to the received request information, the server may return response information specific to the loading request information, and the response information may carry information such as webpage content of the webpage, under this circumstance, it is also capable to re-obtain the browser kernel that is adaptive to the user requested webpage according to the obtained content from the response information specific to the loading request information from the server and preset rule; if the re-obtained adapted browser kernel is different from the adapted browser kernel which is previously obtained based on the request information, it is capable to select the re-obtained adapted browser kernel to load the user requested webpage.

In the second method, since the browser may send the loading request information about loading webpage to the server according to the received request information, the server may return response information specific to the loading request information, and the response information may carry information about webpage content of the webpage, therefore in the method, it is capable to obtain the adaption relation between the user requested webpage and the browser kernel directly according to the obtained content in the response information feedback specific to the loading request information feedback from the server and the preset rule.

Obviously, it is also capable obtain the adaption relation between he user requested webpage and the browser kernel both according to the obtained content from the request information and the obtained content in the response information feedback specific to the loading request information feedback from the server and the preset rule.

In addition, when using the method in each embodiment to load the webpage (which may be during the loading process and after the loading process), it is also capable to detect the condition of loading the user requested webpage; if the condition that the preset kernel needs to be switched is found, it is capable to re-obtain the browser kernel adapted to the webpage according to the preset rule, and uses the re-obtained browser kernel to load the user-requested webpage. Wherein the condition that the preset kernel needs to be switched may include: it is detected that the loading speed is low during loading, or it shows that the webpage is not displayed normally after the load is finished, and so on.

When it is determined the current webpage is suitable for loading by the second browser kernel, it is capable to start the process corresponding to the second browser kernel.

Step 103, using the first browser kernel to generate a second load request of the current webpage when it is monitored the second browser kernel requests to load the current webpage;

after the second browser kernel is switched to, it is capable to user a second browser kernel to use a URL of the current webpage to establish a new browser navigation.

In a preferred embodiment of the disclosure, step 103 may specifically include the following sub-steps:

sub-step S11, invoking a network programming interface WinInet to start session management class CInternetSession;

sub-step S12, when the request of loading the webpage from the second browser kernel is monitored in the session management class CInternetSession, extracting the URL in the request;

sub-step S13, determining whether the URL in the request is the same as the URL in the current webpage; if yes, transmitting the URL in the current webpage to the second browser kernel;

sub-step S14, using the second browser kernel to generate the second load request of the current webpage specific to the URL of the current webpage.

In the embodiment of the disclosure, it is capable to register monitoring HTTP request or HTTPS request in the second browser kernel. In practical application, it is capable to performe a CinternetSeesion object in the WinInet (which is a program logical interface for developing client application with Internet function, being capable of supporting HTTP protocol, FTP protocol and GOPHER protocol), which may be corresponding to each URL of the monitored HTTP request or HTTPS request. If it is determined that the URL is URL for current webpage, performing IPC (inter-process communication, communication between processes, which refers technique or method to two processes or threads to transmit data or signal) according to the URL of the current webpage, the URL in the first browser kernel is transmitted to the second browser kernel. In the second browser kernel, the HTTP request may be performed based on the first browser kernel according to the URL.

Step 104, using a preset first determination rule to search the webpage element which needs intercepting in the current webpage.

The first determination rule may be an intercepting rule which is suitable to the second browser kernel and used for intercepting the floating advertisement of IFRAME (HTML tag, having the function of documents in the documents, or a floating frame) or the floating advertisement of DIV (HTML tag, which may define the partition or section in order to divide the documents into independent and different parts).

In a preferred embodiment of the disclosure, step 104 may include the following sub-steps:

sub-step S21, using the URL of the current webpage to match in a preset black list;

sub-step S22, when matched successfully, determining the successfully-matched webpage element is the webpage element which needs intercepting;

the black list records filter elements, which may be the URL links which need intercepting. The URL link may be obtained from the source code of the current webpage, the URL link may be started from http://, the link may be complete, or wildcard and having complete top-level domain.

The example of the filter element may be hereinbelow:
http://*guize.com/* is
http://www.guize.com/gg/*
http://ww*.guize.com/gg/tnignang_0*.swf
http://c.guize.com/gg/tnignang.g_01.gif
http://www.guize.com/guanggao/*.html When the webpage is open, as long as the page includes the above links, the webpage element indicated by the links may be intercepted.

In specific application, for example, the URL link address of an advertisement in the home page of a certain website is http://www.abc123.com/gg/xiaovouxi/id=PWm4P1n4n0.gif, that means the filtering rule may be http://www.abc123.com/* or http://www.abc123.com/gg/xiaoyouxi/*.gif or http://*.abc123.com/gg/* and so on.

These three filter element all may be used to filter the advertisement, among them, http://www.abc123.com/* can have a wider filtering scope, which may filter other non-advertisement content. The more specific the filter element is, the better the effect of filtering advertisement is.

And/or sub-step S23, using the URL of the current webpage to match in the preset white list;

sub-step S24, when matched successfully, it is determined that the successfully-matched webpage element is not the webpage element that needs intercepting.

Some non-advertisement webpage elements may be filtered when the webpage elements are filtered, at that moment, it is necessary to add some exceptional elements to ensure non-advertisement webpage element cannot be filtered when the advertisement webpage elements are filtered. The exceptional elements may be recorded in a white list, the priority of the white list may be higher than the priority of the black list.

The format of the exceptional element may be the same as the filtered element, for example, if the webpage element under http://www.gize.com/gg/* needs to be filtered, but http://www.guize.com/gg/tuijian.js is need not to be intercepted, the http://www.guize.com/gg/tuijian.js is taken as the exceptional element, by which, the effect that all the webpage elements under guize.com/gg are filtered except the webpage element of tuijian.js.

In practical application, the black list and the white list may be used separately or combined together, specifically, a regular expression may be used to match the black list and/or the white list.

A regular expression is a tool for matching text, which usually comprises some normal characters and some metacharacters, normal characters includes majuscules, minuscules and numbers, metacharacters has special meaning. The matching of regular expression may be considered as, in given character strings, the part matching the given regular expression is searched. It is possible that the character string includes more than one part which satisfies the given regular expression, at that moment, each such part may be called a match. The word match in the disclosure may include three meanings, the first one is adjective, for example, one character string matches an expression; the second one is a verb, for example, the regular expression is matched in the character string; the third one is a noun, which may be "the part of the character string which satisfies the given regular expression" as stated above.

Hereinafter, an example is taken to illustrate the generating rule of the regular expression.

Supposing "hi" is searched, the regular expression "hi" may be used. This regular expression may precisely match such character string, it includes two characters, the front "h" and the back "i", in practical usage, the difference between capital letter or small case letter may be ignored, if the two successive characters "hi" are included in words such as him, history, high and so on, if "hi" is used in search, the "hi" in these words may be found. If a precise search about the word "hi" is needed, it is capable to use \bhi\b.

Wherein \b is a metacharacter in the regular expression, it means the start or end of the word, namely the boundaries of the word. Although English words are divided by spacing or punctuation or line break, \b does not match any of these word separator, it only matches a position.

Supposing a "hi" and a "Lucy" behind the "hi" at a not far away position is searched, it is capable to use \bhi\b.*\bLucy\b, wherein "." is another metacharacter, which may match any character except line break. "*" is also a metacharacter, it represents quantity, that is the content in front of "*" may appear continuously and repeatedly for any times to make the expression matched. Now the meaning of \bhi\b.*\bLucy\b becomes obvious, it means a word "hi", and after any characters with any quantity (except line break), that last word is "Lucy".

The first determination rule in the disclosure may be a black list or a white list, the regular expression is matched based on the URL of the webpage, achieving a simple and fast operation, and lower occupation to system resource.

Step 105, when found, using the second browser kernel to intercept the webpage element.

When found, it is determined that the webpage element which needs intercepting is an advertisement, it is capable to intercept the webpage element.

In a preferred embodiment of the disclosure, the step 105 may further include the sub-steps of:

sub-step S31, returning error code or transparent image data to the second browser kernel;

sub-step S32, using the second browser kernel to determine a DOM element node corresponding to the webpage element;

sub-step S33, using the error code or the transparent image data to replace the DOM element node;

In one situation, it is capable to use the error code of the second browser kernel to replace the intercepted webpage element, the error code may be a request error in the HTTP status code (started with 4), this kind of status code represents it is possible to have error in the client side and impedes the processing of the server, for example, 404 Not Found means a request error, the webpage element which is requested to obtain is not found in the server. 400 Not Request means a semantic mistake, the current request cannot be understood by the server, or request parameter has error. 405 Method Not Allowed means the request method specified in the request line cannot be used to request corresponding resource and so on.

However, error code may be displayed in the webpage as "X" shape icon, to make the webpage more aesthetic, it is capable to use transparent image data such as 1*1 pixel PNG image to replace the intercepted webpage element.

DOM (Document Object Model) is a standard programming interface for processing extensible markup language, DOM may visit and modify content and structure of a document in a way that is independent from the platform and language, it is a commonly-used method for representing and processing a HTML or XML document.

DOM is actually a document model described in object oriented mode, DOM defines the objects needed in representing and modifying document, the behavior and attribute of the objects and the relations between these objects. It is capable to consider the DOM as a tree representation of data and structure in the webpage. However, the page may not be specifically realized by the tree type representation.

The HTML document may be re-constructed via JavaScript, the items on the page may be added, removed, changed or re-arranged.

To change something in the page, JavaScript needs to get the entrance of visiting all element in the HTML document. The document together with the method and attribute for adding, moving, changing or removing the HTML element may be all obtained via DOM.

It is capable to consider the HTML document as a tree structure, the structure may be called a node tree (THML DOM). Via the HTML DOM, all the nodes in the tree may be visited by JavaScript. All the HTML element (node) may be modified, and the node may also be created or deleted.

The nodes in the node tree may have hierarchical relationship between each other. The relationship may be described by parent, child, sibling and other terms. Wherein, parent node has child nodes, child nodes at same level are called sibling (brothers or sisters). In the node tree, the top node is called root. Each node has a parent node except the root. A node may have child with any quantity, the siblings are nodes with the same parent node.

Specifically, it is capable to use multiple kinds of method to find the webpage element which is wished to operate in the node tree:

For example, it is capable to use getElementById( ) and getElementsByTagName( ) to search.

For example, it is capable to use attributes of the parentNode, firstChild and lastChild of an element node.

Wherein the two method of getElementById( ) and getElementsByTagName( ) may be used to search any HTML element in the whole HTML document, the two method may ignore document structure, supposing all the <p> elements in the document are searched, getElementsByTagName( ) may find all of them, no matter which level are the <p> elements located in the document. Meanwhile, getElementById( ) may return correct elements, no matter which positions are they hide in the document structure. These two method may provide any needed HTML elements, no matter which position are they in the document.

Besides, getElementById( ) may return the webpage element via specified ID.

Or, sub-step S34, using the second browser kernel to determine the DOM element node corresponding to the webpage element;

sub-step S35, using a CSS selector to change the transparent attribute in the CSS attribute in the DOM element node to be "true";

CSS.

In another situation, when the DOM element node of the webpage element is determined, it is capable to use the second browser kernel to use CSS (Cascading Style Sheet, a computer language for representing HTML or XML and other document style) selector to change the transparent attribute to be "true" to hide the webpage element.

Or, sub-step S36, using the second browser kernel to determine the DOM element node corresponding to the webpage element;

sub-step S37, deleting the DOM element node.

In another situation, after the DOM element node of the webpage element which needs intercepting is determined, it is capable to delete the DOM element node directly via the second browser kernel.

After the intercepting process is performed to the webpage element which needs intercepting, a new stylesheet may be formed, it is capable to use the new stylesheet to re-render and load the current webpage via the second browser kernel, thus intercepting the webpage element that is the advertisement.

In the disclosure, by integrating at least two browser kernels in one browser, based on the advantage or disadvantage of each browser, when it is determined that the current webpage is suitable for loading by the second browser kernel, activating the second browser kernel to load the current webpage, thusly the efficient of loading the webpage maybe increased. When using the second browser kernel to load the current webpage, it is capable to use advertisement interception rule suitable for the second browser kernel to intercept the advertisement, which avoids poor practicability caused by the disorder in intercepting advertisements when the multi-kernel browser switches the kernels and the non-universality of intercepting rule, improves the efficiency in intercepting the advertisement and successful rate, obtaining a good practicability, the system resource occupation is reduced after the advertisement is intercepted, and the webpage loading efficiency is improved.

As shown in FIG. 2, it is a flow chart showing the steps of the webpage advertisement interception method according to the second embodiment of the disclosure; which may specifically include the following steps:

step 201, using a first browser kernel to receive a first load request of a current webpage at a browser side;

step 202, when it is determined the current webpage is suitable for loading by the first browser kernel, using a preset second determination rule to search the webpage element which needs intercepting in the current webpage;

the second determination rule may be may be a intercepting rule which is suitable to the first browser kernel and used for intercepting the floating advertisement of IFRAME or DIV.

In a preferred embodiment of the disclosure, step 202 may specifically include the following sub-steps:

sub-step S41, using the URL of the current webpage to match in a user-defined intercept list preset in local of the browser side, an intercept list from the browser provider and/or an intercept list in a third party plug-in;

sub-step S42, when matched successfully, determining the successfully-matched webpage element is the webpage element which needs intercepting;

in one situation, the intercept list of the browser side user-defined, the intercept list from the browser provider and/or the intercept list of the third party plug-in may be stored in local of the browser side.

The user-defined browser side may record the URL link which needs intercepting defined according to the user's private hobby, the priority may be the highest.

The intercept list from the browser provider may record the URL link which needs intercepting set by the provider, the URL link may be generated by receiving the user-defined intercept list which is uploaded by the user, or the supplemented and completed one based on the user-defined intercept list, and it may also be user-defined, the priority may be lower than the user-defined intercept list.

The intercept list of the third party plug-in may record the URL link which needs intercepting set by the third-party plug-ins, such as Adintercept (ADB), Adintercept Plus (ABP) and so on. The priority may be the lowest.

In specifically application, the user-defined intercept list, the intercept list from the browser provider and the intercept list in the third-party plug-in may be used separately, or used at the same time according to priorities. Similarly it is capable to perform URL match in the user-defined intercept list, the intercept list from the browser provider and the intercept list in the third-party plug-in by using regular expression.

And/or sub-step S43, sending the URL of the current webpage to the server side;

sub-step S44, receiving the webpage element which needs intercepting returned from the server side; the webpage element being the webpage element which is matched in the server side using a user-defined intercept list preset in local of the server side, an intercept list from the browser provider and/or an intercept list of a third party plug-in and is matched successfully.

It should be noted that, the server may be the server corresponding to the current browser, and it may also be other specified servers, the embodiment of the disclosure is not limited thereto.

In the situation, the user-defined intercept list, the intercept list from the browser provider and the intercept list from the third-party plug-in may be stored in the browser side.

In practical application, user-defined intercept list, the intercept list from the browser provider and the intercept list from the third-party plug-in may be used separately or combined together, specifically, a regular expression may be used to match the user-defined intercept list, the intercept list from the browser provider and the intercept list from the third-party plug-in.

The second determination rule in the disclosure may be a user-defined intercept list, the intercept list from the browser provider and the intercept list from the third-party plug-in, which leads to various determining forms, high practicability, the match is based on webpage URL, which leads to simple and fast operation, high accuracy in intercepting advertisements, and less occupation to system resource.

Step 203, when found, using the first browser kernel to intercept the webpage element.

When found, it is determined that the webpage element which needs intercepting is an advertisement, it is capable to intercept the webpage element.

In a preferred embodiment of the disclosure, step 203 may specifically include the follow sub-steps:

sub-step S51, returning error code or transparent image data to the first browser kernel;

sub-step S52, using the first browser kernel to determine a DOM element node corresponding to the webpage element;

sub-step S53, using the error code or the transparent image data to replace the DOM element node;

In one situation, it is capable to replace the intercepted webpage element by error code or transparent image data via the first browser kernel.

Or, sub-step S54, using the first browser kernel to determine the DOM element node corresponding to the webpage element;

sub-step S55, using a CSS selector to change the transparent attribute of the CSS attribute to be "true";

in another situation, when the DOM element node of the webpage element needs intercepting is determined, it is capable to use CSS (Cascading Style Sheet, a computer language for representing HTML or XML and other document style) selector to change the transparent attribute to be "true" to hide the webpage element.

Or, sub-step S56, using the first browser kernel to determine the DOM element node corresponding to the webpage element;

sub-step S57, deleting the DOM element node.

In another situation, after the DOM element node of the webpage element which needs intercepting is determined, it is capable to delete the DOM element node directly via the first browser kernel.

After the intercepting process is performed to the webpage element which needs intercepting, a new stylesheet may be formed, it is capable to use the new stylesheet to re-render and load the current webpage via the second browser kernel, thus intercepting the webpage element that is the advertisement.

In the disclosure, when it is determined the current webpage is suitable for loading by the first browser kernel, it directly uses the first browser kernel to load the current webpage, and use the advertisement interception rule suitable for the first browser kernel to intercept the advertisement, realizing the seamless switching intercepting of the multi-kernel browser to the advertisement, improves the advertisement efficiency and success rate, improves the efficiency in intercepting the advertisement and successful rate, obtaining a good practicability, the system resource occupation is reduced after the advertisement is intercepted, and the webpage loading efficiency is improved.

To the method embodiments, in order to illustrate concisely, they are described as a series of motion combination. However, as known by the skilled person in the art, the embodiment of the disclosure is not limited as motion sequence, because according to the embodiment of the disclosure, some steps may be performed in other sequence or performed at the same time. Besides, a skilled person in the art should also know, the embodiments described in the specification are only preferable embodiments, the related motions may not be necessary in the embodiment of the disclosure.

Referring to FIG. 3, it is a block diagram showing a webpage advertisement interception device according to an embodiment of the disclosure; which may specifically include the following modules:

a first load request receiving module 301, configured to use a first browser kernel to receive a first load request of a current webpage at a browser side;

a second browser kernel activating module 302, configured to activate a second browser kernel when determining the current webpage is suitable for loading by the second browser kernel;

a second load request generating module 303, configured to use the first browser kernel to generate a second load request of the current webpage when it is monitored the second browser kernel requests to load the current webpage;

a first webpage element searching module 304, configured to use a preset first determination rule to search a webpage element which needs intercepting in the current webpage;

a first webpage element intercepting module 305, configured to use the second browser kernel to intercept the webpage element when the webpage element is found.

In a preferred embodiment of the disclosure, the device may further include the following modules:

a second webpage searching module, configured to, when it is determined the current webpage is suitable for loading by the first browser kernel, using a preset second determination rule to search the webpage element which needs intercepting in the current webpage;

a second webpage element intercepting module, configured to use the first browser kernel to intercept the webpage element when the webpage element is found.

In a preferred embodiment of the disclosure, the second load request generating module is further configured to:

invoke a network programming interface WinInet to start session management class CInternetSession;

when the request of loading the webpage from the second browser kernel is monitored in the session management class CInternetSession, extract the URL in the request;

determine whether the URL in the request is the same as the URL in the current webpage; if yes, transmitting the URL in the current webpage to the second browser kernel;

use the second browser kernel to generate the second load request of the current webpage specific to the URL of the current webpage.

In a preferred embodiment of the disclosure, the first webpage element searching module is further configured to:

use the URL of the current webpage to match in a preset black list;

when matched successfully, determine the successfully-matched webpage element is the webpage element which needs intercepting;

and/or use the URL of the current webpage to match in a preset white list;

when matched successfully, determine the successfully-matched webpage element is not the webpage element which needs intercepting.

In a preferred embodiment of the disclosure, the first webpage element intercepting module is further configured to:

return error code or transparent image data to the second browser kernel;

use the second browser kernel to determine a DOM element node corresponding to the webpage element;

use the error code or the transparent image data to replace the DOM element node;

or, use the second browser kernel to determine the DOM element node corresponding to the webpage element;

using a CSS selector to change the transparent attribute in the CSS attribute of the DOM element node to be "true";

or, use the second browser kernel to determine the DOM element node corresponding to the webpage element;

delete the DOM element node.

In a preferred embodiment of the disclosure, the second webpage element searching module is further configured to:

use the URL of the current webpage to match in a user-defined intercept list preset in local of the browser side, an intercept list from the browser provider and/or an intercept list in a third party plug-in;

when matched successfully, determine the successfully-matched webpage element is the webpage element which needs intercepting;

and/or send the URL of the current webpage to a server side;

receive the webpage element which needs intercepting returned from the server side; the webpage element being the webpage element which is matched in the server side using a user-defined intercept list preset in local of the server side, an intercept list from the browser provider and/or an intercept list of a third party plug-in and is matched successfully.

In a preferred embodiment of the disclosure, the second webpage element intercepting module is further configured to:

return error code or transparent image data to the first browser kernel;

use the first browser kernel to determine a DOM element node corresponding to the webpage element;

use the error code or the transparent image data to replace the DOM element node;

or, use the first browser kernel to determine the DOM element node corresponding to the webpage element;

use a CSS selector to change the transparent attribute of the CSS attribute to be "true";

or, use the first browser kernel to determine the DOM element node corresponding to the webpage element;

delete the DOM element node.

The device embodiments are similar as the method embodiments, therefore they are described simple, and the related parts may be referred to the illustration of the method embodiments.

The disclosure further provides a browser, which may specifically include the following modules:

a first load request receiving module, configured to use a first browser kernel to receive a first load request of a current webpage at a browser side;

a second browser kernel activating module, configured to activate a second browser kernel when determining the current webpage is suitable for loading by the second browser kernel;

a second load request generating module, configured to use the first browser kernel to generate a second load request of the current webpage when it is monitored the second browser kernel requests to load the current webpage;

a first webpage element searching module, configured to use a preset first determination rule to search a webpage element which needs intercepting in the current webpage;

a first webpage element intercepting module, configured to use the second browser kernel to intercept the webpage element when the webpage element is found.

In a preferred embodiment of the disclosure, the browser may include the following modules:

a second webpage searching module, configured to, when it is determined the current webpage is suitable for loading by the first browser kernel, using a preset second determination rule to search the webpage element which needs intercepting in the current webpage;

a second webpage element intercepting module, configured to use the first browser kernel to intercept the webpage element when the webpage element is found.

In a preferred embodiment of the disclosure, the second load request generating module is further configured to:

invoke a network programming interface WinInet to start session management class CInternetSession;

when the request of loading the webpage from the second browser kernel is monitored in the session management class CInternetSession, extract the URL in the request;

determine whether the URL in the request is the same as the URL in the current webpage; if yes, transmitting the URL in the current webpage to the second browser kernel;

use the second browser kernel to generate the second load request of the current webpage specific to the URL of the current webpage.

In a preferred embodiment of the disclosure, the first webpage element searching module is further configured to:

use the URL of the current webpage to match in a preset black list;

when matched successfully, determine the successfully-matched webpage element is the webpage element which needs intercepting;

and/or use the URL of the current webpage to match in a preset white list;

when matched successfully, determine the successfully-matched webpage element is not the webpage element which needs intercepting.

In a preferred embodiment of the disclosure, the first webpage element intercepting module is further configured to:

return error code or transparent image data to the second browser kernel;

use the second browser kernel to determine a DOM element node corresponding to the webpage element;

use the error code or the transparent image data to replace the DOM element node;

or, use the second browser kernel to determine the DOM element node corresponding to the webpage element;

using a CSS selector to change the transparent attribute in the CSS attribute of the DOM element node to be "true";

or, use the second browser kernel to determine the DOM element node corresponding to the webpage element;

delete the DOM element node.

In a preferred embodiment of the disclosure, the second webpage element searching module is further configured to;

use the URL of the current webpage to match in a user-defined intercept list preset in local of the browser side, an intercept list from the browser provider and/or an intercept list in a third party plug-in;

when matched successfully, determine the successfully-matched webpage element is the webpage element which needs intercepting;

and/or send the URL of the current webpage to a server side;

receive the webpage element which needs intercepting returned from the server side; the webpage element being the webpage element which is matched in the server side using a user-defined intercept list preset in local of the server side, an intercept list from the browser provider and/or an intercept list of a third party plug-in and is matched successfully.

In a preferred embodiment of the disclosure, the second webpage element intercepting module is further configured to:

return error code or transparent image data to the first browser kernel;

use the first browser kernel to determine a DOM element node corresponding to the webpage element;

use the error code or the transparent image data to replace the DOM element node;

or, use the first browser kernel to determine the DOM element node corresponding to the webpage element;

use a CSS selector to change the transparent attribute of the CSS attribute to be "true";

or, use the first browser kernel to determine the DOM element node corresponding to the webpage element;

delete the DOM element node.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the network accessing device, server and main control device according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 4:
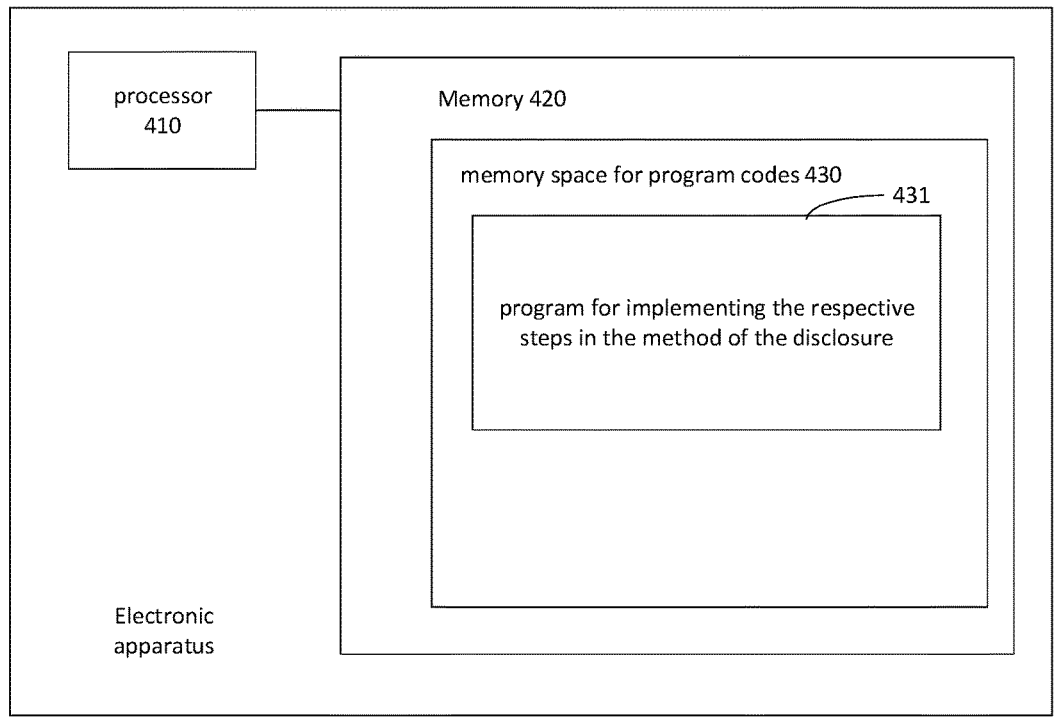
FIG. 4 is a block diagram showing an electronic apparatus for executing the method according to the disclosure.
Figure 5:
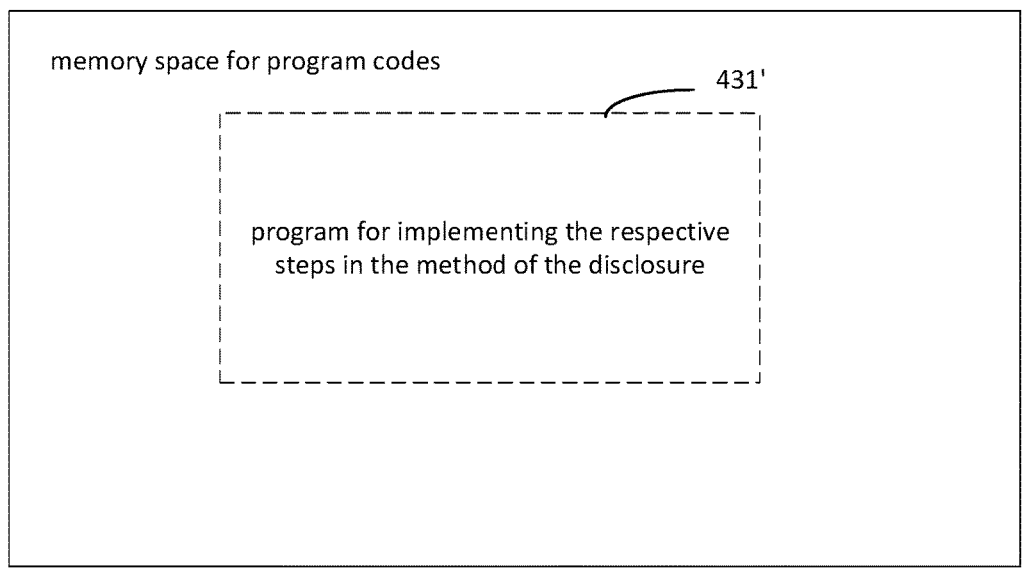
FIG. 5 is a schematic diagram of a memory cell which is used to store and carry program codes for realizing the method of the disclosure.

For example, FIG. 4 illustrates a block diagram of a webpage advertisement interception electronic apparatus for realizing the disclosure such as a computer or a portable apparatus. Traditionally, the electronic apparatus includes a processor 410 and a computer program product or a computer readable medium in form of a memory 420. The memory 420 could be electronic memories such as flash memory, EEPROM (Electrically Erasable Programmable Read-Only Memory), EPROM, hard disk or ROM. The memory 420 has a memory space 430 for executing program codes 431 of any steps in the above methods. For example, the memory space 430 for program codes may include respective program codes 431 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 5. The memory cells may be provided with memory sections, memory spaces, etc., similar to the memory 420 of the communication device as shown in FIG. 4. The program codes may be compressed for example in an appropriate form. Usually, the memory cell includes computer readable codes 431' which can be read for example by processors 410. When these codes are operated on the communication device, the communication device may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method of intercepting webpage advertisement, comprising:
using a first browser kernel to receive a first load request of a current webpage at a browser side;
activating a second browser kernel in response to a determination that the current webpage is suitable for loading by the second browser kernel;
using the first browser kernel to generate a second load request of the current webpage when it is monitored the second browser kernel requests to load the current webpage;
using a first predetermined rule to search a webpage element which needs intercepting in the current webpage;
using the second browser kernel to intercept the webpage element when the webpage element is found;
wherein the using the first browser kernel to generate a second load request of the current webpage when it is monitored the second browser kernel requests to load the current webpage further comprises:
invoking a network programming interface WinInet to start session management class CInternetSession;
when a request of loading a webpage from the second browser kernel is monitored in the session management class CInternetSession, extracting a URL in the request;
determining whether the URL in the request is the same as a URL in the current webpage;
transmitting the URL in the current webpage to the second browser kernel in response to a determination that the URL in the request is the same as the URL in the current webpage;
using the second browser kernel to generate the second load request of the current webpage specific to the URL of the current webpage.

2. The method according to claim 1, further comprising:
when it is determined the current webpage is suitable for loading by the first browser kernel, using a second predetermined rule to search the webpage element which needs intercepting in the current webpage;
using the first browser kernel to intercept the webpage element when the webpage element is found.

3. The method according to claim 2, wherein the using a second predetermined rule to search the webpage element which needs intercepting in the current webpage comprises:
using the URL of the current webpage to match in a user-defined intercept list preset locally at the browser side, an intercept list from the browser provider or an intercept list in a third party plug-in,
when matched successfully, determining the successfully-matched webpage element is the webpage element which needs intercepting;
or
sending the URL of the current webpage to a server side, receiving the webpage element which needs intercepting returned from the server side; the webpage element being successfully matched at the server side using a user-defined intercept list preset locally at the server side, an intercept list from the browser provider or an intercept list of a third party plug in.

4. The method according to claim 2, wherein the using the first browser kernel to intercept the webpage element comprises:
returning error code or transparent image data to the first browser kernel,
using the first browser kernel to determine a DOM element node corresponding to the webpage element,
using the error code or the transparent image data to replace the DOM element node;
or,
using the first browser kernel to determine the DOM element node corresponding to the webpage element,
using a CSS selector to change a transparent attribute of CSS attribute to be "true";
or,
using the first browser kernel to determine the DOM element node corresponding to the webpage element,
deleting the DOM element node.

5. The method according to claim 1, wherein the using a first predetermined rule to search the webpage element which needs intercepting in the current webpage comprises:
using the URL of the current webpage to match in a preset black list,
when matched successfully, determining the successfully-matched webpage element is the webpage element which needs intercepting;
or
using the URL of the current webpage to match in a preset white list,
when matched successfully, determining the successfully-matched webpage element is not the webpage element which needs intercepting.

6. The method according to claim 1, wherein the using the second browser kernel to intercept the webpage element comprises:
returning error code or transparent image data to the second browser kernel,
using the second browser kernel to determine a DOM element node corresponding to the webpage element,
using the error code or the transparent image data to replace the DOM element node;
or,
using the second browser kernel to determine the DOM element node corresponding to the webpage element,
using a CSS selector to change a transparent attribute in CSS attribute of the DOM element node to be "true";
or,
using the second browser kernel to determine the DOM element node corresponding to the webpage element,
deleting the DOM element node.

7. An electronic apparatus for webpage advertisement interception, comprising:

a memory having instructions stored thereon;
a processor configured to execute the instructions to perform operations for webpage advertisement interception, the operations comprising:
using a first browser kernel to receive a first load request of a current webpage at a browser side;
activating a second browser kernel in response to a determination that the current webpage is suitable for loading by the second browser kernel;
using the first browser kernel to generate a second load request of the current webpage when it is monitored the second browser kernel requests to load the current webpage;
using a first predetermined rule to search a webpage element which needs intercepting in the current webpage;
using the second browser kernel to intercept the webpage element when the webpage element is found;
wherein the using the first browser kernel to generate a second load request of the current webpage when it is monitored the second browser kernel requests to load the current webpage further comprises:
invoking a network programming interface WinInet to start session management class CInternetSession;
when a request of loading a webpage from the second browser kernel is monitored in the session management class CInternetSession, extracting a URL in the request;
determining whether the URL in the request is the same as a URL in the current webpage;
transmitting the URL in the current webpage to the second browser kernel in response to a determination that the URL in the request is the same as the URL in the current webpage;
using the second browser kernel to generate the second load request of the current webpage specific to the URL of the current webpage.

8. The electronic apparatus according to claim 7, wherein the processor is further configured to perform:
when it is determined the current webpage is suitable for loading by the first browser kernel, using a second predetermined rule to search the webpage element which needs intercepting in the current webpage;
using the first browser kernel to intercept the webpage element when the webpage element is found.

9. The electronic apparatus according to claim 8, wherein the using a second predetermined rule to search the webpage element which needs intercepting in the current webpage further comprises:
using the URL of the current webpage to match in a user-defined intercept list preset locally at the browser side, an intercept list from the browser provider or an intercept list in a third party plug-in,
when matched successfully, determining the successfully-matched webpage element is the webpage element which needs intercepting;
or
sending the URL of the current webpage to a server side, receiving the webpage element which needs intercepting returned from the server side; the webpage element being successfully matched at the server side using a user-defined intercept list preset locally at the server side, an intercept list from the browser provider or an intercept list of a third party plug in.

10. The electronic apparatus according to claim 8, wherein the using the first browser kernel to intercept the webpage element when the webpage element is found further comprises:
returning error code or transparent image data to the first browser kernel,
using the first browser kernel to determine a DOM element node corresponding to the webpage element,
using the error code or the transparent image data to replace the DOM element node;
or,
using the first browser kernel to determine the DOM element node corresponding to the webpage element,
using a CSS selector to change a transparent attribute of CSS attribute to be "true";
or,
using the first browser kernel to determine the DOM element node corresponding to the webpage element,
deleting the DOM element node.

11. The electronic apparatus according to claim 7, wherein the using a first predetermined rule to search a webpage element which needs intercepting in the current webpage further comprises:
using the URL of the current webpage to match in a preset black list,
when matched successfully, determining the successfully-matched webpage element is the webpage element which needs intercepting;
or
using the URL of the current webpage to match in a preset white list,
when matched successfully, determining the successfully-matched webpage element is not the webpage element which needs intercepting.

12. The electronic apparatus according to claim 7, wherein using the second browser kernel to intercept the webpage element when the webpage element is found further comprises:
returning error code or transparent image data to the second browser kernel,
using the second browser kernel to determine a DOM element node corresponding to the webpage element,
using the error code or the transparent image data to replace the DOM element node;
or,
using the second browser kernel to determine the DOM element node corresponding to the webpage element,
using a CSS selector to change a transparent attribute in CSS attribute of the DOM element node to be "true";
or,
using the second browser kernel to determine the DOM element node corresponding to the webpage element,
deleting the DOM element node.

13. A non-transitory computer readable medium, having computer programs stored thereon that, when executed by one or more processors of an electronic apparatus, cause the electronic apparatus to perform:
activating a second browser kernel in response to a determination that the current webpage is suitable for loading by the second browser kernel;
using a first browser kernel to generate a second load request of the current webpage when it is monitored the second browser kernel requests to load the current webpage;
using a first predetermined rule to search a webpage element which needs intercepting in the current webpage;
using the second browser kernel to intercept the webpage element when the webpage element is found;
wherein the using a first browser kernel to generate a second load request of the current webpage when it is monitored the second browser kernel requests to load the current webpage further comprises:

invoking a network programming interface WinInet to start session management class CInternetSession;

when a request of loading a webpage from the second browser kernel is monitored in the session management class CInternetSession, extracting a URL in the request;

determining whether the URL in the request is the same as a URL in the current webpage;

transmitting the URL in the current webpage to the second browser kernel in response to a determination that the URL in the request is the same as the URL in the current webpage;

using the second browser kernel to generate the second load request of the current webpage specific to the URL of the current webpage.

\* \* \* \* \*